(12) United States Patent
Schuetz et al.

(10) Patent No.: US 6,381,979 B1
(45) Date of Patent: May 7, 2002

(54) DUAL CONTAINMENT CONDENSATION ASSEMBLY

(75) Inventors: Reinhard Schuetz, Calgary; Ernest Jacobson, Sylvan Lake; Wayne Bowd, Red Deer, all of (CA)

(73) Assignee: DualTank Corp., Calgary (CA)

( * ) Notice: Subject to any disclaimer, the term of this patent is extended or adjusted under 35 U.S.C. 154(b) by 0 days.

(21) Appl. No.: 09/447,213

(22) Filed: Nov. 23, 1999

(30) Foreign Application Priority Data

Dec. 11, 1998 (CA) .............................................. 2255500
Jun. 7, 1999 (CA) .............................................. 2274251

(51) Int. Cl.$^7$ .............................. F25D 21/14; F17D 1/00
(52) U.S. Cl. ................. 62/291; 62/85; 62/288; 137/264
(58) Field of Search .......................... 62/291, 272, 288, 62/285, 3.4, 85; 210/175; 137/312, 264, 587; 220/560.1

(56) References Cited

U.S. PATENT DOCUMENTS

| | | | | |
|---|---|---|---|---|
| 3,367,120 A | * | 2/1968 | Franklin | |
| 3,788,096 A | * | 1/1974 | Brilloit | ..................... 62/285 X |
| 4,148,617 A | * | 4/1979 | Clark | |
| 5,119,640 A | * | 6/1992 | Conrad | ..................... 62/272 X |
| 5,255,735 A | * | 10/1993 | Raghava et al. | ........... 62/3.4 X |
| 5,623,833 A | * | 4/1997 | Mitchell et al. | ............... 62/85 |

* cited by examiner

Primary Examiner—Henry Bennett
(74) Attorney, Agent, or Firm—Thomas E. Malyszko

(57) ABSTRACT

An assembly for condensing a vapour and storing the resulting condensed liquid has a condensation unit for condensing the vapour which is located above a dual containment storage tank for storing the resulting condensed liquid.

21 Claims, 3 Drawing Sheets

DUAL CONTAINMENT CONDENSATION ASSEMBLY

FIELD OF THE INVENTION

The present invention relates to condensation units for condensing fluids and containers for storing liquid substances, for use in the petroleum, industrial, agricultural and petrochemical industries.

BACKGROUND OF THE INVENTION

Many industrial and commercial processes create vapourized liquids, particularly hot vapours, which must be condensed into a cooler liquid form for storage and eventual disposal or treatment. In the petroleum industry, for instance, a glycol/water vapour mixture is created at gas wellsites which can not be released into the atmosphere to avoid pollution of the environment. One accepted method of dealing with the glycol/water vapour is to run the hot vapour through a series of underground pipes to cool and condense the vapour into liquid form, and then to pass the liquid into an underground storage tank. Another accepted method is to run the vapour through aboveground piping having cooling fins, and then passing the condensed liquid into an underground storage facility to avoid freezing of the liquid. These underground storage tanks suffer from several deficiencies, as set out in U.S. Pat. No. 5,971,009. Likewise, the piping creates its own problems. Large lengths of required piping takes up valuable space at wellsites, is difficult and costly to install and maintain, and is prone to leakage. Some leaks might not be detected, thereby contaminating the surrounding soil.

What is desired therefore is a novel assembly for condensing vapours and storing the resulting condensed liquid which overcomes the limitations and problems of the prior art arrangements. Preferably, the entire assembly should be aboveground for ease of installation and maintenance. It should provide in one compact unit the ability to condense a vapour and to store the resulting liquid. The liquid should be stored in a dual containment assembly to avoid leakage of the liquid to the surroundings. The dual containment assembly may be provided with an integral heating system to prevent freezing of the stored liquid.

Hence, in one aspect the invention provides an apparatus for urging condensation of a vapour comprising:
- a generally cylindrical inner wall portion defining an inner chamber;
- an outer wall portion extending circumferentially about said inner wall portion forming a series of interconnected cooling chambers to define a meandering cooling path for said vapour to promote condensation of said vapour into a liquid; and,
- said cooling path having an inlet end for introducing said vapour thereinto, and having an opposed outlet end for escape of said liquid to a storage means and of any uncondensed vapour to said inner chamber.

In another aspect the invention provides an assembly for vapour condensation and liquid storage comprising:
(a) an aboveground containment tank for receiving and storing said liquid;
(b) a condensation assembly for location atop said tank comprising:
 (i) an inner wall defining an inner chamber;
 (ii) an outer wall extending circumferentially about said inner wall to form a plurality of interconnected cooling chambers defining a meandering cooling path for said vapour along said outer wall to promote condensation of said vapour into said liquid; and,
 (iii) said cooling path having an inlet end for introducing said vapour thereinto, and having an opposed outlet end for escape of said liquid to said tank and of any uncondensed vapour to said inner chamber.

In another aspect the invention provides a method of urging condensation of a vapour into a liquid comprising passing said vapour through the above-noted apparatus.

In yet another aspect the invention provides a method of vapour condensation and liquid storage comprising introducing said vapour into an inlet end of the above-noted assembly.

BRIEF DESCRIPTION OF THE DRAWING FIGURES

Embodiments of the invention will now be described, by way of example only, with reference to the accompanying drawings, wherein.

DESCRIPTION OF PREFERRED EMBODIMENT

A dual containment condensation assembly 10 according to the present invention generally comprises a condensation component or unit 20, mounted atop a containment assembly, or storage tank 50, for storing a liquid substance exiting the condensation unit 20. The storage tank 50 may be of the type shown and described in applicant's co-pending Canadian Patent Application No. 2,196,941 and in U.S. Pat. No. 5,971,009 for a "Dual Containment Assembly", and is incorporated herein by reference. The condensation unit 20 receives a fluid and is configured to urge the fluid to separate into gas and liquid components, the liquid component being deposited by gravity and stored in the cylindrically shaped tank 50 for future disposal or treatment as required. For illustrative purposes, the fluid in this instance will be a vaporized liquid which may contain some condensed liquids encountered in the petroleum industry.

Figure 1:
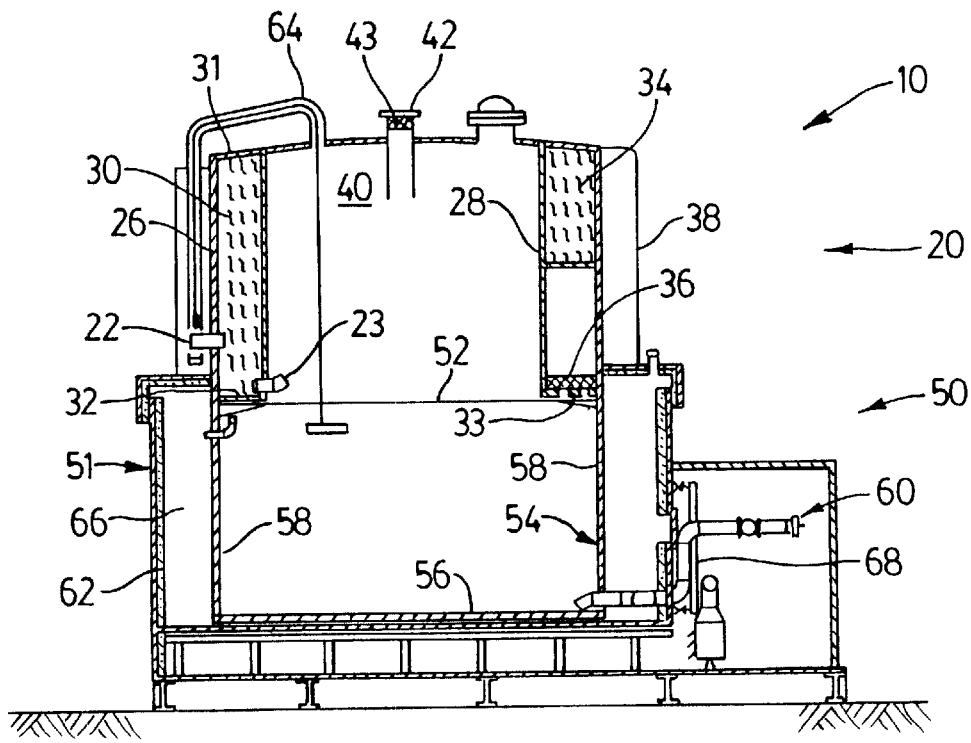
FIG. 1 is an elevation view of a condensation and containment assembly according to a preferred embodiment of the present invention.
Figure 2:
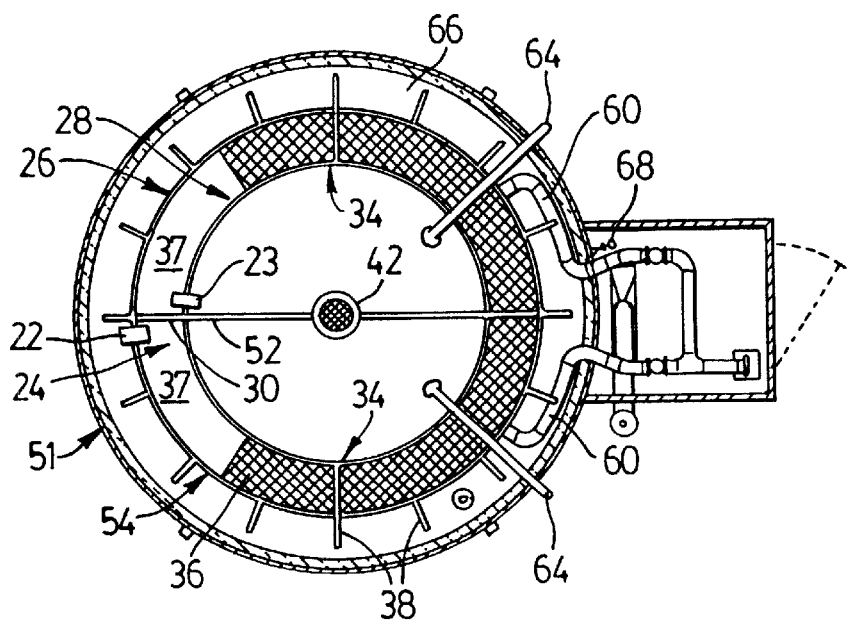
FIG. 2 is a plan view of the assembly of FIG. 1.

Referring specifically to the first embodiment shown in FIGS. 1 and 2, the fluid enters the cylindrically shaped condensation unit 20 of the assembly 10 through an inlet 22 and expands in an annular space 24 between the outer and inner side walls 26 & 28, respectively, of the condensation unit 20. Since vapour tends to rise, the inlet 22 is located at a lower end of the annular space 24. The entering fluid is directed counterclockwise through the annular space 24. The entering fluid is prevented from traveling directly clockwise to a liquid outlet 23 near the floor 32 of the condensation unit by a "full" divider baffle 30 extending between the inner and outer walls 28, 26 and between the condensation unit's roof 31 and floor 32. The roof 31 is non-porous to prevent upward escape of the fluid therethrough from the annular space 24. A series of partial divider baffles 34, affixed to the inside of the roof 31 and spaced circumferentially about the annular space 24, trap the fluid's hot vapours and increase their retention time within the annular space by deflecting the vapours downwardly as they travel counterclockwise about the annular space 24.

As the vapours travel about the annular space they condense into liquid form and drop through the floor 32 into the dual-containment storage tank 50 below where additional retention time occurs. Most of the floor 32 is formed of a grid support and support plate assembly 33 laid over with a "mist pad" 36, namely a type of fine grating or intertwined strands of fine metallic or other suitable materials, which allows the condensed liquid to travel therethrough into the tank 50. A portion of the floor 32 at the inlet and outlet ends is formed of solid plates 37 which are sloped downwardly away from the full divider baffle 30 to direct any liquid collected thereon toward the adjoining mist pad 36.

A series of vertically disposed plate-like cooling fins 38 extend outwardly from the condensation unit's outer side wall 26 to increase heat transfer between the annular space 24 and the ambient. In the instant example, the fins serve to cool the condensation unit to promote liquid condensation.

In the first embodiment, the storage tank 50 is formed of an inner or primary storage tank 54 which is surrounded by an outer or secondary containment tank 51. The primary tank 54 has a vertically disposed, planar, plate-like weir 52 affixed to the bottom 56 and sides 58 of the primary tank 54, which weir 52 is about the same height as the primary storage tank 54. In the embodiment shown, the weir 52 divides the tank 54 in half, and is in line with the full divider baffle 30 (as viewed in FIG. 2). The exact location of the weir will depend on several factors, including the type of fluid to be treated, prevailing climactic conditions, and the like, and may be aided through actual field experimentation. The purpose of the weir 52 is to provide a partial 2-phase separation of the condensed liquids. For example, in the case of glycol/water vapour, the glycol condenses at a lower temperature and will therefore accumulate in the first part of the primary storage tank 54 divided by the weir indicated by "phase 1", and the water vapour will condense later and be mainly accumulated in the second part indicated by "phase 2". The weir is optional and may be omitted if it is not suitable nor required for a desired containment assembly application.

The primary vapour outlet 23 from the annular space 24 of the condensation unit 20 is located near the floor 32 and extends through the inner side or shell wall 28 into an inside space or chamber 40. A "final" vent outlet connection 42 for the complete condensation and storage tank assembly 10 is located in the middle of the roof 31, and is fitted with another mist pad 43 to extract any additional suspended liquids in the fluid in the chamber 40. The vent outlet 42 extents partially into the chamber 40 of the condensation unit to provide additional retention time for vapours produced from the liquid collected in the primary storage tank 54, as well as any remaining vaporized product carried over from the annular space 24 of the condensation unit into the chamber 40.

The condensed liquid is emptied from the primary storage tank 54 through a pump out connection 60 near the bottom 56 of the tank.

The dual-containment storage tank assembly 10 may or may not require heating and/or insulation 62 to prevent the stored liquid from freezing, depending on the local climate where installed. The tank assembly should be elevated above ground level, as shown.

To protect the tank assembly from overflowing, the unit is fitted with an external gauge board assembly 64 and possibly liquid level shutdown switches. Any accidental overflow into the secondary containment space 66 is detected through the use of an externally mounted sight glass 68.

Figure 3:
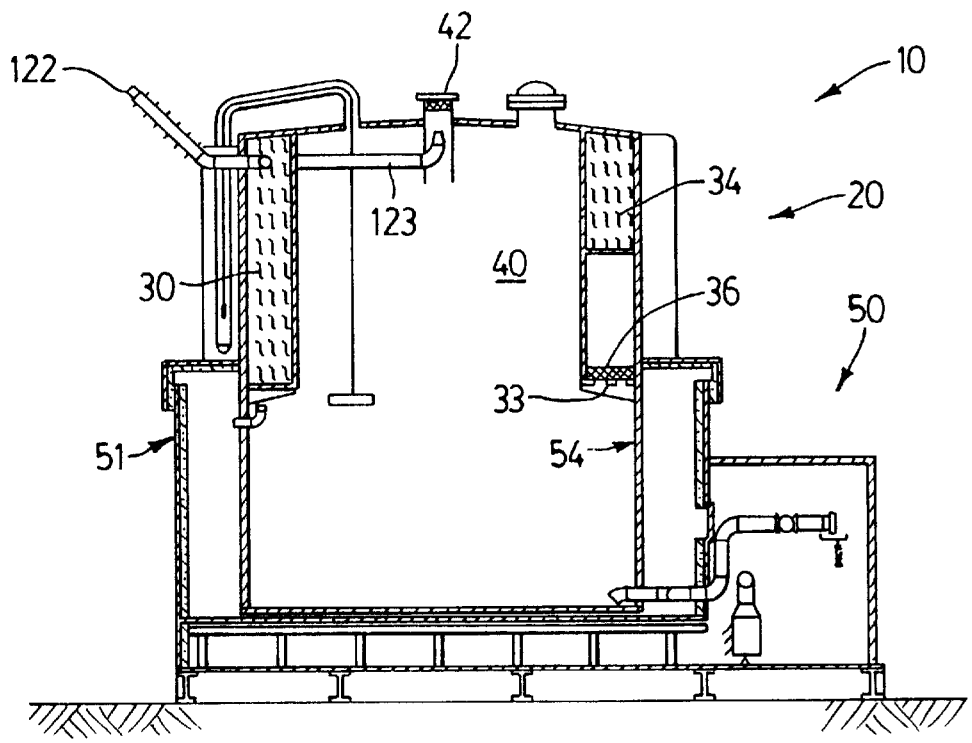
FIG. 3 shows, in elevation, a second embodiment of the assembly of the present invention.
Figure 4:
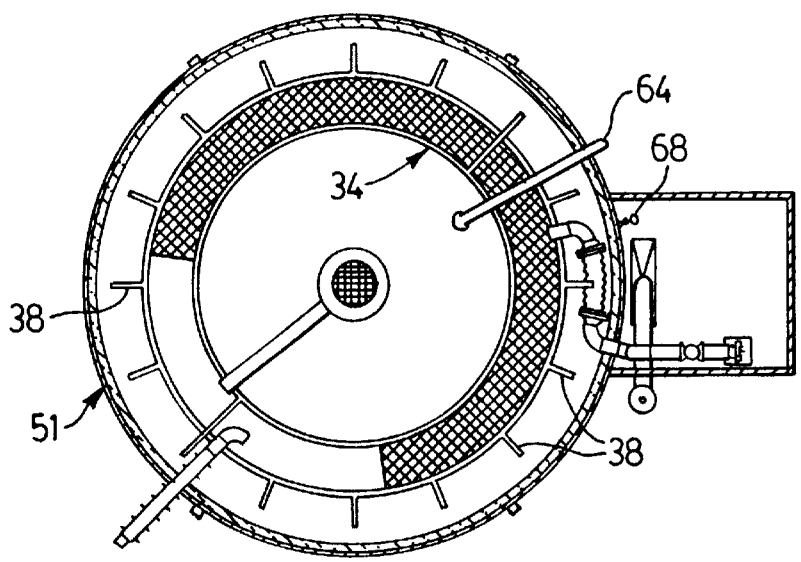
FIG. 4 is a plan view of the assembly of FIG. 3.

FIGS. 3 and 4 show a second embodiment of the invention which has a different, namely elevated, inlet 122 into the condensation unit, an outlet 123 which leads directly to the vent 42, and omits a weir in the primary storage tank 54. The same reference numerals are used for the same or substantially similar components.

Figure 5:
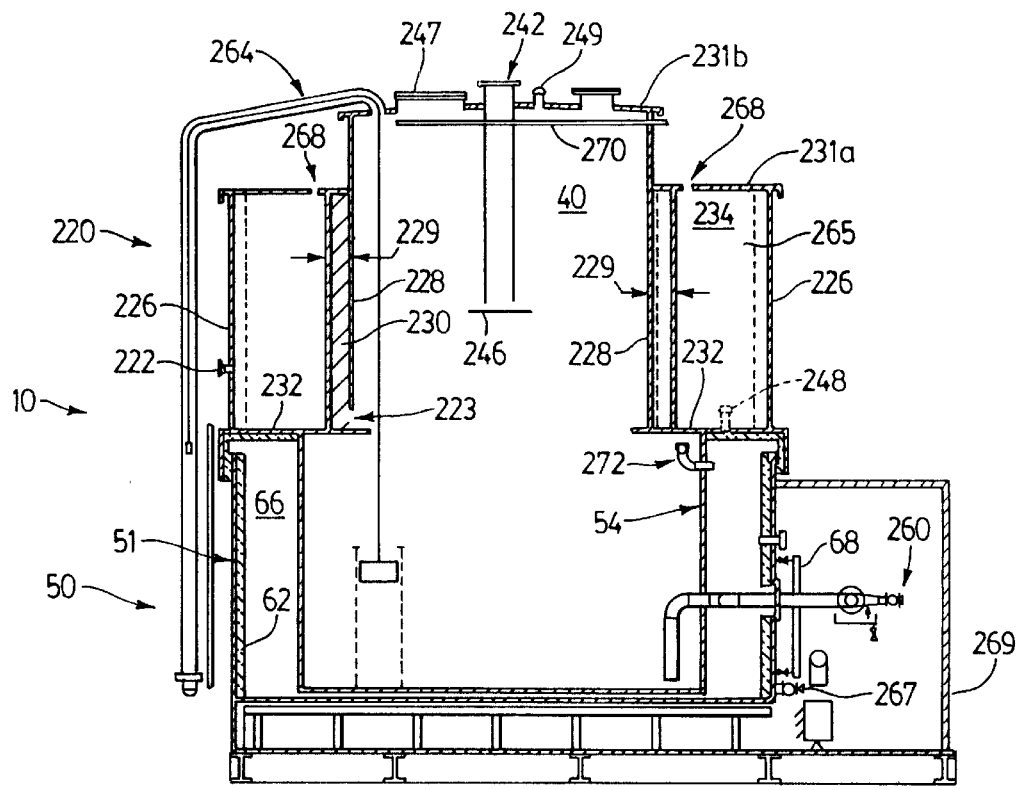
FIG. 5 shows, in elevation, a third embodiment of the assembly of the present invention; and, FIG. 6 is a plan view of the assembly of FIG. 5.
Figure 6:
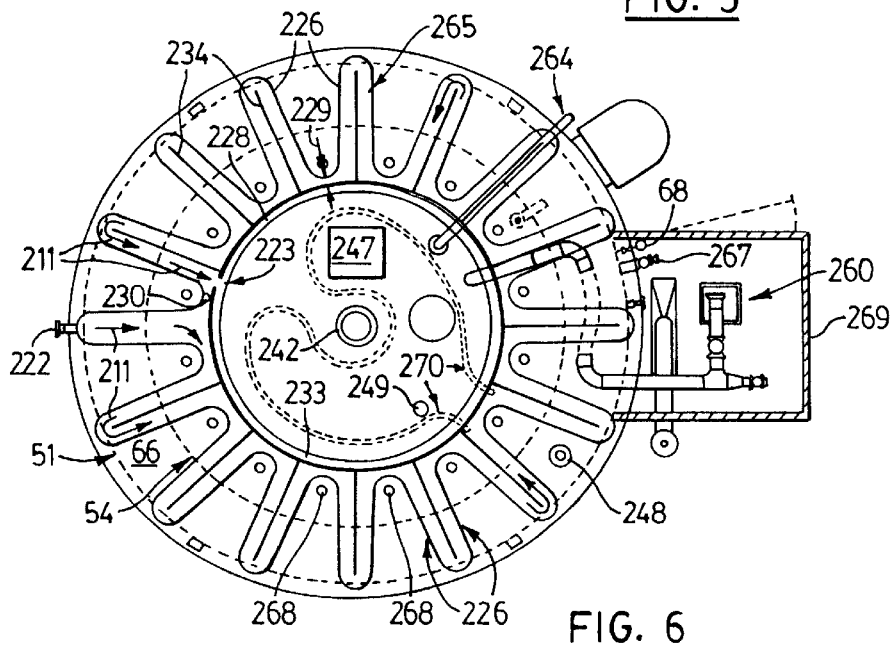

FIGS. 5 and 6 show a third embodiment of the invention in which the condensation unit 220 has a gear-like appearance in plan view to further increase the condensation unit's contact surface area with the vapourized liquid, and therefore to provide greater cooling capabilities and allow a larger quantity of vapourized liquid to be treated (i.e. condensed) in a given period than with the first two embodiments. This embodiment avoids the need for mist pads. Rather, the floor 232 is liquid impervious and made of a solid piece of steel or other suitable material. The same reference numerals are used for the same or substantially similar components.

The condensation unit 220 has a cylindrical center shell formed by an inner wall 228 and a sinusoidal outer wall 226 forming the "teeth" of the gear-like shape. The radially extending sidewall segments 227 of the outer wall 226 create a series of cooling chambers 265 communicating with one another to form a single continuous meandering cooling path for the vapourized liquid introduced through inlet 222. Heat is transferred from the cooling chambers to the ambient through the outer wall, serving to cool the condensation unit and promote liquid condensation.

Each trough of the outer wall is spaced from the inner wall 228, say by 2 inches (approx. 51 mm) as shown at 229, to allow for communication between the cooling chambers 265. A deflector baffle 234 generally bisects each cooling chamber 265 to direct the vapourized liquid along a path which follows the perimeter of the outer wall, as indicated by arrows 211. Each deflector baffle 234 extends between the condensation unit's fluid impervious roof 231a and floor 232, and extends from the inner wall 228 toward the outer tip of the cooling chamber, stopping short of the tip of the outer wall. A clearance of about 3 inches (approx. 76 mm) on each side between the baffle 234 and the outer wall 226, as shown in FIG. 6, has provided good results. The cooling chamber which has the inlet 222 omits a deflector baffle 234, but rather has a divider baffle 230 to perform a similar function as those in previous embodiments, namely to direct the vapourized liquid entering through the inlet 222 to move through the condensation unit 220 in a counterclockwise direction.

Condensed liquid which falls to the floor 232 drains into the lower storage tank 50 through an outlet drain hole 223 located near the floor and on the opposite side of the divider baffle 230 from the inlet 222. Hence, the inlet 222 and the outlet 223 are at opposed ends of the meandering cooling path. Any vapour which reaches the end of the cooling path may also exit the outlet 223 into the inner chamber 40. It is noted that the floor's 232 inner circular opening forms a lip 233 upon which the inner wall 228 of the center shell is supported.

In this embodiment the inner wall 228 extends above the roof 231a for exposure to the ambient, thereby providing a means to further cool vapour which has entered and risen to the top of the inner chamber 40, which is capped by a roof 231b. The vent 242 also extends further or lower into the chamber than prior embodiments to increase vapour retention time in the inner chamber 40. A strike plate 246 serves to partially obstruct vapour entrance to the vent 242. Vapour contacting the strike plate 246 will have a tendency to condense and fall into the storage tank 50.

The third embodiment has several other features:

a hinged manway 247 is provided for access into the assembly through the roof 231b, most commonly for finishing painting of the inner wall after completion of welding during manufacture of the units;

an annulus vent 248 through the floor 232 provides a means of escape to atmosphere for any vapours which might collect in the secondary containment tank 51 of the condensation unit 220;

the configuration of the pump out connection 260 shown in FIG. 5 reduces the number of elbows or bends therein as compared to the other embodiments;

an additional or spare capped connection 249 is provided in the roof 231b of the condensation unit to allow introduction of fluid from a source other than the one feeding the inlet 222 (e.g. from a meter/separator facility) for storage in the tank 50;

a two inch drain 267 and plug for draining the secondary containment tank 51 has been located inside the heated and insulated utility shed 269 to avoid freeze up of the drain and for ease of pumping, if required;

a novel magnetic level gauge assembly 264 is provided for actuating a magnetic switch to shut off fluids entering the inlet 222 should the storage tank 50 reach its capacity, or for other desired functions;

a number of vent holes 268 (of about 1.5 in. (38 mm) diameter each) are located circumferentially about the roof 231a just outside each trough of the sinusoidal outer wall 226 to allow any hot air trapped beneath the roof 231a to escape upwardly and away from the condensation unit, thus increasing the cooling efficiency of the cooling chambers 266;

an overflow pipe and float assembly 272 may be added to allow any excess liquid collected in the primary storage tank 54 to escape into the secondary containment space 66; and, optionally, one or more cooling coils 270 may be placed inside the chamber 40 and tacked or otherwise supported from underneath the roof 231b as shown. The coil(s) 270 may also pass adjacent to and be supported from the portion of the inner wall 228 which extends above the lower roof 231a, and may have a spiraling configuration. The tubing diameter of the coil(s) 270 can be 0.75 or 1.0 inch hollow piping, for example, for passing a refrigerant or other suitable fluid from outside the condensation unit 220 to cool off and condense any vapour in the vicinity of the cooling coils within the chamber 40.

In use, vapourized liquid enters through the inlet 222 into the first cooling chamber 265 (i.e. the one without a deflector baffle 234) and is directed counterclockwise through the adjoining cooling chambers 265, as indicated at 211. Vapour condensation occurs as the moving vapour strikes the divider baffles 230, and as the vapour moves along and is cooled by the outer wall 226. As the quantity of condensed liquid on the floor 232 increases, it eventually moves along the cooling path and reaches the outlet 223, where the liquid exits over the lip 233 and drops into the primary storage tank 54. Any vapour which has managed to reach the end of the cooling path near the outlet 223 without condensing may be retained for a time near the top of the last cooling chamber for further condensation. Should enough vapour arrive, some of the vapour may be urged downwardly for escape through the lower outlet 223 into the inner chamber 40 for further condensation, as noted earlier.

The above description is intended in an illustrative rather than a restrictive sense and variations to the specific configurations described may be apparent to skilled persons in adapting the present invention to specific applications. Such variations are intended to form part of the present invention insofar as they are within the spirit and scope of the claims below.

We claim:

1. An apparatus for urging condensation of a vapour comprising:

a generally cylindrical inner wall portion defining an inner chamber;

an outer wall portion exposed to the ambient extending circumferentially about said inner wall portion forming a series of interconnected cooling chambers to define a meandering cooling path for said vapour to promote condensation of said vapour into a liquid; and, said cooling path having an inlet end for introducing said vapour thereinto, and having an opposed outlet end for escape of said liquid to a storage means and of any uncondensed vapour to said inner chamber.

2. The apparatus of claim 1 wherein said outer wall portion includes sidewall segments extending generally radially to said inner wall portion for increasing the exposure of said outer wall portion to the ambient, each of said cooling chambers being located between pairs of said sidewall segments to define a generally sinusoidal cooling path for said vapour.

3. The apparatus of claim 2 wherein a baffle member located in at least one of said cooling chambers urges said vapour to follow said sidewall segments of said outer wall portion, thereby extending said cooling path.

4. The apparatus of claim 3 wherein said baffle member comprises a plate element which extends radially from said inner wall portion and substantially bisects the respective cooling chamber.

5. The apparatus of claim 1 wherein an upper segment of said inner wall portion extends above said outer wall portion for exposure to the ambient to promote cooling of said inner chamber.

6. The apparatus of claim 1 wherein a roof member caps said inner chamber and includes a vent assembly for venting said vapour out of said inner chamber, said vent assembly having a first means for increasing vapour retention time in said inner chamber to promote condensation comprising an elongate hollow body portion which extends downwardly from said roof member and has a bottom end open to said inner chamber.

7. The apparatus of claim 6 wherein said vent assembly includes a second means for increasing vapour retention time comprising at least one of a mist pad within said body portion to urge further condensation of said vapour moving therethrough and a strike plate at said bottom end of the body portion to obstruct direct access of said vapour in said inner chamber into said bottom end.

8. The apparatus of claim 6 further including at least one cooling element extending in said inner chamber below said roof member for carrying a fluid to urge condensation of said vapour.

9. The apparatus of claim 1 wherein a roof member caps said inner chamber and further including at least one cooling element extending in said inner chamber below said roof member for carrying a fluid to urge condensation of said vapour.

10. The apparatus of claim 1 further including a plurality of cooling fins secured to said outer wall portion and extending radially outwardly therefrom, said fins being spaced circumferentially about said outer wall portion to promote heat transfer between said cooling chambers and the ambient.

11. An assembly for vapour condensation and liquid storage comprising:
   (a) an aboveground containment means for receiving and storing said liquid;
   (b) a condensation assembly in fluid communication with said containment means comprising:
      (i) an inner wall defining an inner chamber;
      (ii) an outer wall extending about said inner wall to form a plurality of interconnected cooling chambers defining a meandering cooling path for said vapour along said outer wall to promote condensation of said vapour into said liquid; and,
      (iii) said cooling path having an inlet end for introducing said vapour thereinto, and having an opposed outlet end for escape of said liquid to said containment means and of any uncondensed vapour to said inner chamber.

12. The assembly of claim 11 wherein said outer wall includes sidewall segments extending outwardly away from said inner wall for increasing the exposure of said outer wall to the ambient, each of said cooling chambers being located between pairs of said sidewall segments to define a generally sinusoidal cooling path for said vapour.

13. The assembly of claim 12 wherein a baffle located in said cooling chambers extends said cooling path by urging said vapour to follow said sidewall segments.

14. The assembly of claim 13 wherein said baffle comprises a plate element which extends outwardly from said inner wall and substantially bisects the respective cooling chamber.

15. The assembly of claim 11 wherein an upper segment of said inner wall extends above said outer wall for exposure to the ambient to promote cooling of said inner chamber.

16. The assembly of claim 11 wherein a roof member caps said inner chamber and includes a vent for venting said vapour out of said inner chamber, said vent having a first means for increasing vapour retention time in said inner chamber to promote condensation comprising an elongate hollow body which extends downwardly from said roof and has a bottom end open to said inner chamber.

17. The assembly of claim 16 wherein said vent includes a second means for increasing vapour retention time comprising at least one of a mist pad within said body to urge further condensation of any vapour moving therethrough and a strike plate at said bottom end of the body to obstruct direct access of said vapour into said bottom end.

18. The assembly of claim 16 further including at least one cooling coil extending in said inner chamber below said roof for carrying a refrigerant to urge condensation of said vapour.

19. The assembly of claim 11 further including at least one cooling element extending in said inner chamber for carrying a fluid to urge condensation of said vapour.

20. A method of urging condensation of a vapour into a liquid comprising:
   passing said vapour into an unpressurized condensation assembly;
   urging said vapour about an outer wall portion of said condensation assembly;
   promoting condensation of said vapour into said liquid by cooling said outer wall portion through exposure to the ambient;
   venting any uncondensed vapour from said outer wall portion to an inner chamber encompassed by said outer wall portion; and,
   providing for escape of said liquid to a containment means.

21. The method of claim 20 further comprising providing said vapour with a meandering cooling path in said outer wall portion.

* * * * *